Feb. 9, 1965  L. G. GROSSI  3,168,958
TRANSFER MECHANISM FOR BREAD, ROLLS AND THE LIKE
Filed Oct. 5, 1962  3 Sheets-Sheet 1

INVENTOR.
LEWIS G. GROSSI
BY
Wynne + Finken
ATTORNEY

Feb. 9, 1965  L. G. GROSSI  3,168,958
TRANSFER MECHANISM FOR BREAD, ROLLS AND THE LIKE
Filed Oct. 5, 1962  3 Sheets-Sheet 2

INVENTOR.
LEWIS G. GROSSI
BY
Wynne + Finkan
ATTORNEY

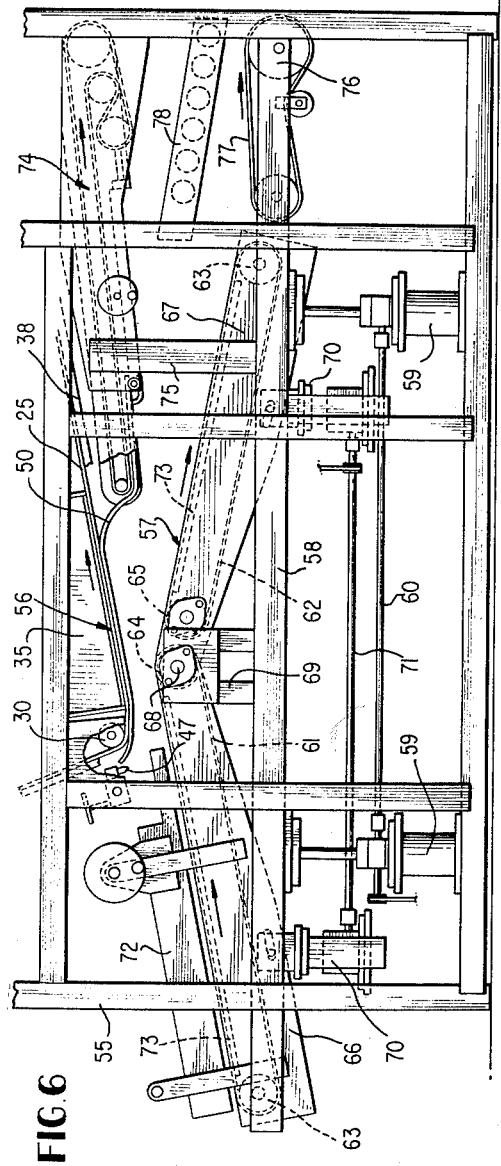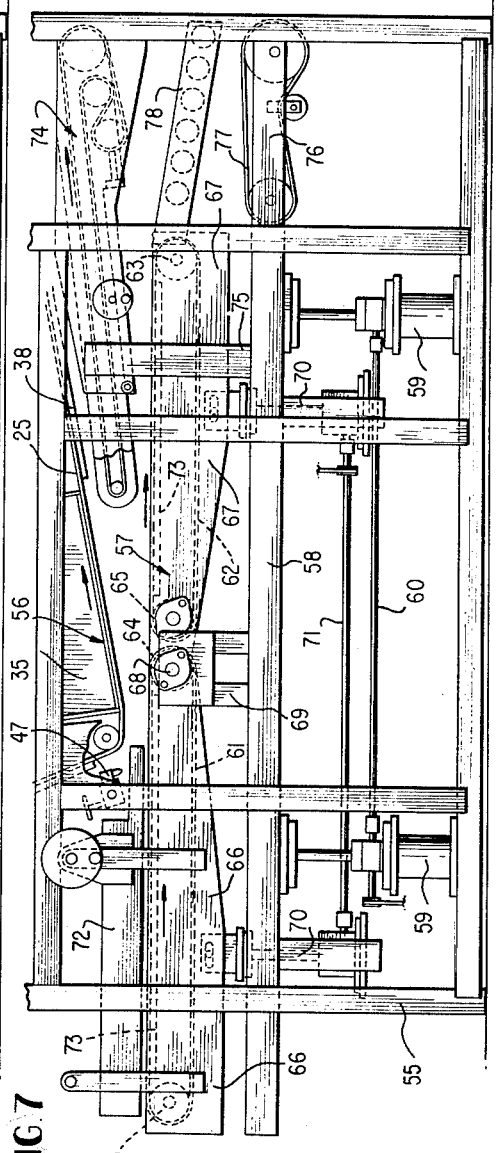

United States Patent Office 3,168,958
Patented Feb. 9, 1965

3,168,958
TRANSFER MECHANISM FOR BREAD,
ROLLS AND THE LIKE
Lewis G. Grossi, York, Pa., assignor to Alto
Company, York, Pa., a partnership
Filed Oct. 5, 1962, Ser. No. 228,686
16 Claims. (Cl. 214—309)

This invention relates to an apparatus for removing bakery products from baking pans.

Mor specifically, the invention is concerned with automatic depanning of bread loaves during the transfer thereof from the oven to wrapping or other processing machinery.

U.S. Patent No. 3,080,079 granted March 5, 1963, for Transfer Mechanism, Lewis G. Grossi et al., discloses a method of and apparatus for depanning buns or rolls including hot dog (finger) and hamburger (sandwich) rolls, and contains subject matter in common with the present application; and one of the objects of this invention is to provide a bread loaf depanning apparatus readily convertible to a bun or roll depanner of the general type shown in said prior patent.

The problems involved in separating bread loaves from their baking pans while hot are somewhat different from the problems incident to depanning rolls and other small lightweight bakery products. In the case of bread loaves and similar large or relatively heavy bakery products, the problem of lifting the loaves to depan them without rupturing or otherwise damaging their tender crusts is a difficult one, which heretofore has not been completely solved by devices or methods in the prior art.

Prior art devices or methods for depanning bread loaves, embodying vacuum means for separating the loaves from their pans have not been entirely satisfactory. Generally speaking, the prior art has utilized a rather high degree of vacuum and this vacuum is applied to the loaves during their passage through a relatively long vacuum zone and over a relatively long time interval, with the result that the soft tender crusts have frequently been ruptured or seriously deformed, thereby rendering the loaves not entirely satisfactory for sale. Additional prior art devices have employed vacuum cup means including valve means in direct contact with the loaves, and such means frequently tend to become clogged with crumbs or the like. Still other prior art schemes involve inverting the baking pans to remove the loaves along with other loaf dislodging operations. All of these arrangements have proven to be somewhat slow, and for this and other reasons, the prior art devices and methods for automatically depanning bread loaves have not been universally adopted by the industry.

According to the present invention, the above and other deficiencies of the prior art are completely overcome by the provision of a rapidly and efficiently operating apparatus and method for depanning bread loaves while they are still hot, without damage to the crusts thereof, and by the use of a relatively gentle vacuum of about one-half of the magnitude commonly employed, and with the loaves subjected to the lifting vacuum during a materially shorter time interval.

The essential improvement over the prior art therefore resides in the quick separation of bread loaves from their pans by abrupt tilting and lowering of the pans while a gentle lifting vacuum is applied to the loaves during their passage through a short suction zone and during a brief time interval, while the loaves are conveyed upwardly and away from the pans. In contrast to this, the prior art applies a greater degree of lifting vacuum to the loaves for a longer time interval while the loaves and pans are gradually separated during passage through a much longer vacuum zone.

A primary object of the invention is, therefore, to separate the bread loaves from their pans by the application of a minimum degree of vacuum to the loaves during the shortest possible time interval and to thereby effect a quick separation of the loaves and pans rather than a very gradual separation.

The invention, in essence, embodies an overhead inclined uphill vacuum conveyor for the loaves, having a relatively short lifting vacuum zone. Beneath the vacuum conveyor is a pan conveyor including an uphill inclined portion, a downhill empty pan discharge portion and an apex between such portions over which the pans are adapted to rock or tilt as their centers of gravity pass over the apex. The location of the apex relative to the vacuum lifting zone and the angles of inclination of the vacuum conveyor and the uphill-downhill portions of the pan conveyor are critical and important in the invention apparatus and method. In a modification of the apparatus, adjusting means are provided to render the pan conveyor generally level and this, in effect, converts the apparatus for use in depanning buns or rolls.

Other important objects and advantageous features of the invention will be apparent from the following description and accompanying drawings, wherein for the purpose of illustration herein, specific embodiments of this invention are set forth in detail, and wherein:

FIGURE 6 is a side elevation, partly broken away, of a modified form of bread loaf depanning and transfer apparatus, readily convertible to an apparatus for handling buns or rolls; and FIGURE 7 is a similar side elevation showing the apparatus of FIGURE 6 adjusted to constitute a bun or roll depanner.

Figure 1:
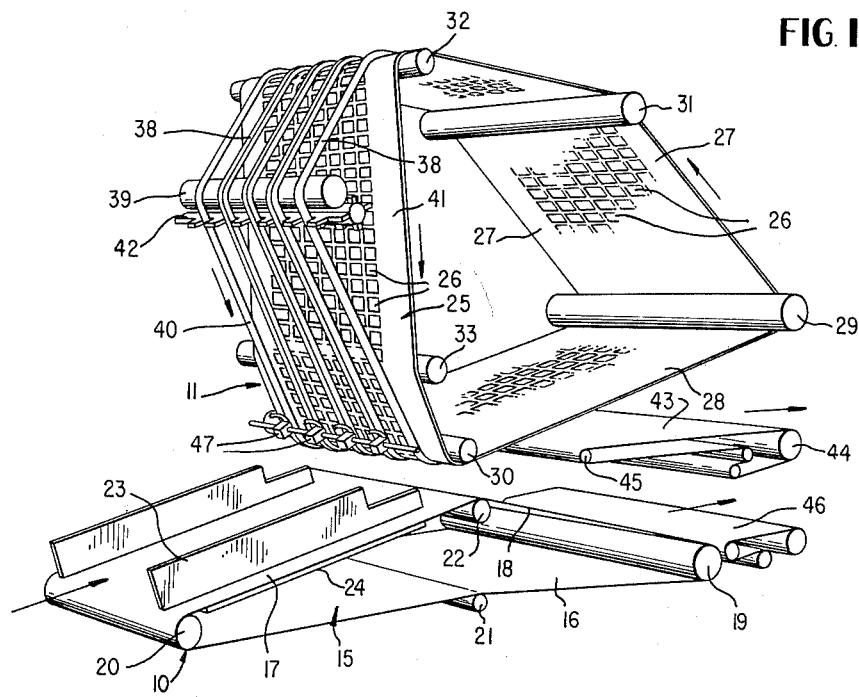
FIGURE 1 is a partly diagrammatic perspective view of the essential elements of the apparatus employed in the practice of the method of depanning bread loaves.
Figure 2:
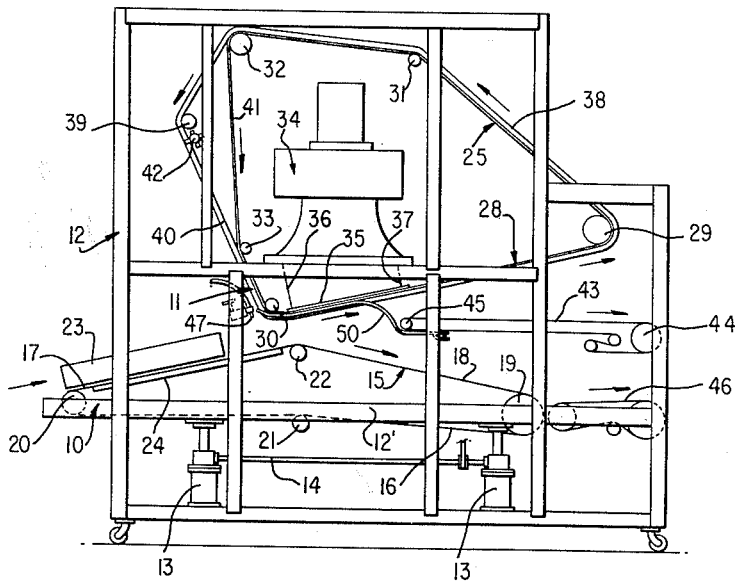
FIGURE 2 is a partly diagrammatic side elevation of the apparatus on a more complete basis.

Referring now to the drawings in detail, where like numerals designate like parts throughout the same, attention being directed first to FIGURES 1 through 5, wherein a generally horizontal pan conveyer 10 is arranged below an overhead vacuum loaf conveyer 11, with the latter suitably fixedly mounted upon a main supporting framework 12, similar to the framework shown in the above-mentioned patent. The pan conveyer 10 is bodily adjustable vertically toward and from the vacuum conveyer 11 and includes a rigid sub-frame 12' secured to the tops of conventional lifting jacks 13 arranged in pairs at the opposite sides thereof. The jacks 13 are mechanically linked as at 14 to operate in unison and the jacks may be power operated in a conventional manner.

The pan conveyer 10 comprises an endless flexible conveyer belt 15 having a bottom substantially horizontal run 16 and an upper run consisting of an inclined uphill portion 17 and a downhill inclined portion 18. The belt 15 is trained over a pair of end rolls 19 and 20 and the roll 19 is powered to cause movement of the belt 15 in the direction of the arrows shown in the drawings. A slack take-up roll 21 is arranged below the bottom run 16 of the belt, as indicated. A guide roll 22 for the upper run of the belt 15 is arranged therebeneath substantially midway between the rolls 19 and 20 and above the latter, and the roll 22 maintains the upper run of the belt suitably taut and also establishes the angles of inclination of the uphill and downhill belt portions 17 and 18, and defines an apex at the top of the pan conveyer structure. The uphill and downhill belt portions 17 and 18 are inclined about 12 degrees below the horizontal and these angles constitute an essential and critical feature of the invention as will be further described.

Laterally adjustable guide means 23 for the pans entering upon the belt portion 17 is provided and this guide means may be substantially identical to the corresponding guide means shown in above-mentioned patent and need not therefore be fully described herein. Suitable stationary magnet means 24 is mounted close to the bottom of uphill belt portion 17 to attract the metallic pans thereon and prevent retrograde slippage thereof on the moving conveyer belt. This magnet means is substantially conventional.

The vacuum conveyer 11 comprises an endless flexible belt 25 formed of neoprene or the like, and provided over the major portion of its area with a multiplicity of uniformly spaced equally sized relatively large rectangular openings 26, preferably having their long axes extending transversely of the belt 25 and their shorter axes extending longitudinally thereof. The marginal edge portions 27 of the belt 25 are imperforate. The belt 25 may be substantially identical to the corresponding neoprene belt in above-mentioned patent.

The belt 25 includes a bottom inclined uphill run 28, parallel to the uphill belt portion 17 and spaced above the latter. The bottom run 28 extends forwardly of the belt portion 17 and overlies the downhill belt portion 18 in divergent relation thereto with an included angle of approximately 24 degrees therebetween. The lower end of the belt run 28 is approximately directly above the apex of the pan conveyer 10 as defined by the roll 22.

At the ends of the inclined bottom run 28, the belt 25 engages a pair of rolls 29 and 30 suitable journaled upon the framework 12. One or both of these rolls may be conventionally powered to cause movement of the belt 25 in the direction of the arrows shown. The upper reaches of the belt 25 are widely separated from the lower run 28 by a series of spaced guide rolls 31, 32 and 33, which rolls together with the rolls 29 and 30 impart a substantially five-sided configuration to the belt 25, as shown. The large open space interiorly of the belt 25 accommodates suction fan means 34, suitably rigidly mounted upon the framework 12. The means 34 may be substantially identical to the corresponding means shown in the above-mentioned prior patent and need not be fully described herein.

The suction fan means 34 includes a downwardly opening vacuum nozzle 35 having its mouth inclined at about 12 degrees to the horizontal and arranged in close proximity to the inclined bottom run 28 of the perforated belt 25. The vacuum nozzle 35 spans substantially the entire width of the belt run 28 transversely, but extends over a portion only of the belt run 28 near the lower end thereof, beginning at a point substantially directly above the apex roll 22. The side walls 36 and 37 of vacuum nozzle 35 define the limits of a relatively narrow vacuum zone to act upon the bread loaves for separating them from their pans and temporarily attaching them to the uphill vacuum loaf conveyer belt means. The upper limit of the vacuum zone defined by the nozzle side wall 37 terminates near and below the longitudinal midpoint of the belt run 28.

The vacuum conveyer 11 further comprises a plurality of endless flexible cushioning and vacuum sealing strips 38 formed of soft compressible material such as foam rubber or the like. The strips 38 are formed separately from the belt 25 and surround the latter snugly, and the several strips 38 travel with the belt 25 in the direction of the arrows during the operation of the apparatus. A separator roll 39 engages the strips 38 somewhat below the upper guide roll 32 and maintains a generally vertical portion 40 of each cushioning strip spaced outwardly from the adjacent generally vertical portion 41 of belt 25. An indexable strip spacing and guide head 42 for the several strips 38 engages them near and below the roll 39, and this head 42 is suitably secured to the framework 12 and may be substantially identical in construction and operation to the indexable head shown in the mentioned for a like purpose in the mentioned prior patent.

Somewhat below the belt run 28 and between the latter and the downhill belt portion 18 a substantially level loaf transfer conveyer belt 43 is suitably mounted on rolls 44 and 45, the former of which is powered to drive the belt 43 in the direction of the arrow. The entire transfer conveyer 43 is bodily adjustable vertically with the pan conveyer 10 toward and from the relatively stationary conveyer 11. The inlet end of the belt 43 defined by the roll 45 is substantially directly below the nozzle wall 37 defining the end of the vacuum zone.

A generally horizontal empty pan transfer conveyer 46 is suitably arranged at the discharge end of pan conveyer 10 to receive empty pans and carry them to a washing station or to some assembly point for immediate reuse. The conveyer 46 is also bodily adjustable vertically with the conveyer 10.

The several conveyer belts of the apparatus above described are all adapted to be driven in unison and at the required speeds, preferably by a single drive motor and suitable gearing not shown herein, which elements are substantially identical to the corresponding elements in said prior patent. Preferably, the vacuum conveyer belt 25 moves at a slightly greater rate than the pan conveyer belt 15. This assures the proper separation of loaves from their pans as will be further described. The conveyers 43 and 46 may be driven at the same speed as the belt 25 to eliminate any pile-up of loaves on the conveyer 43 and any pile-up of pans on the conveyer 46.

Immediately in advance of the vacuum conveyer 11 and near the top of uphill belt portion 17, downwardly directed air nozzles 47 are mounted upon the framework to continuously direct jets of compressed air upon the pan loaves 48 adjacent the side walls of the baking pans 49 containing the loaves. These air jets serve to initially loosen the bread loaves from the pans immediately prior to the entry of the loaves into the suction zone beneath the nozzle 35. The air jets may also serve to lift the loaves somewhat within their pans and assist them into engagement with the vacuum conveyer means.

Somewhat below the nozzle 35 and belt run 28 and between these elements and the upper portion of conveyer 10, curved guide rails 50 are mounted to engage the leading strap 49' of each pan assembly to assure downward tilting or rocking of the pans onto the downhill belt portion 18 as the pans travel over the apex of the pan conveyer.

Operation

Figure 4:
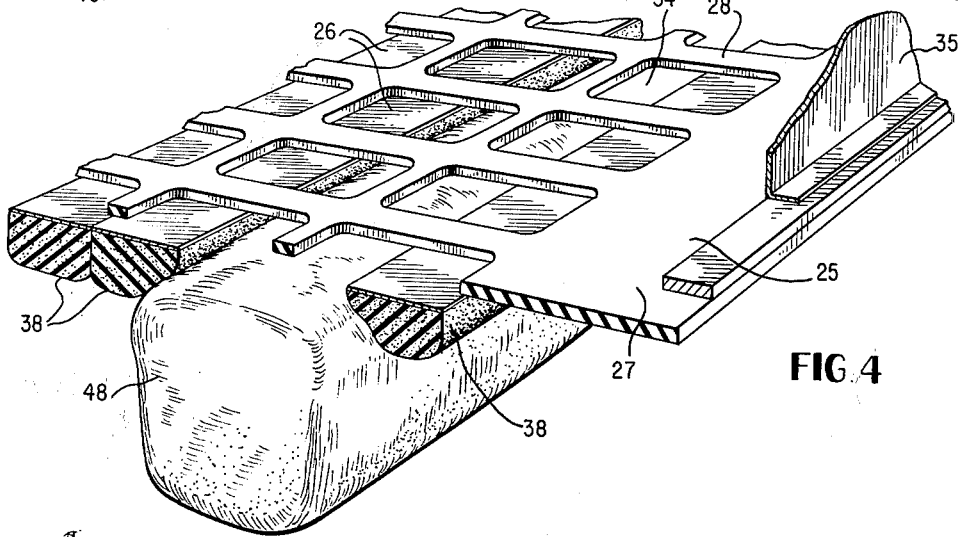
FIGURE 4 is an enlarged fragmentary perspective view partly in section, showing the engagement of a loaf with vacuum conveyor belt means.
Figure 5:
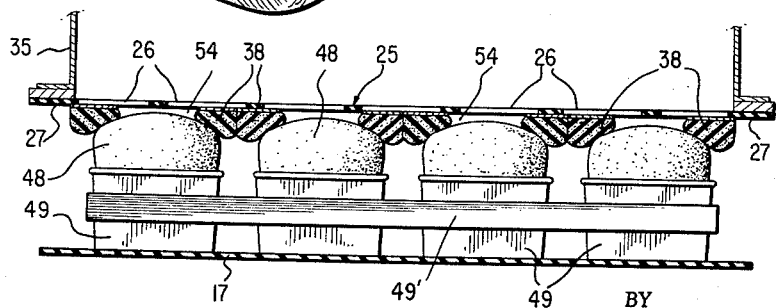
FIGURE 5 is a transverse vertical section through the vacuum conveyor means while engaging a group of panned bread loaves therebelow.

Integrated groups of the pans 49 containing loaves 48 are delivered in succession by suitable means onto the uphill belt portion 17, and the pans and loaves have their long axes extending longitudinally of the conveyer means upon entering the apparatus. The cushioning strips 38 and the pan guiding means 23 are pre-adjusted generally as described in said prior patent to assure proper engagement of the strips with the bread loaves as depicted in FIGURES 4 and 5. As shown therein, the cushioning and sealing strips 38 engage the upper longitudinal corners of the loaves along their entire lengths and maintain the loaves spaced somewhat from the neoprene belt 25 so that there is never direct contact of the loaves with the belt. The strips 38 are deformable to conform to the curvature of the loaves without materially deforming or damaging the latter including their soft tender crusts. Longitudinally open passages 54 are formed between the tops of the loaves and the perforated belt 25 and between each pair of cushioning and sealing strips 38. The lifting vacuum acting on the tops of the loaves 48 is partially vented through the open passages 54 but a sufficient vacuum is maintained through the random arrangement of the belt perforations 26 and between the sealing strips 38 to allow the proper lifting and conveying of the loaves by the vacuum conveyer means.

The panned loaves travel upwardly with the uphill belt portion 17 toward the vacuum conveyer 11 and toward the apex of the pan conveyer defined by the roll 22. As each pan group approaches the apex, FIGURE 3, the compressed air jets from the nozzles 47 impinge upon the loaves and pans to initially dislodge the loaves, as stated. Immediately thereafter, as the pans begin to pass over the apex of the pan conveyer and while the pans are still inclined and traveling uphill with their loaves, such loaves begin to enter beneath the suction zone defined by the nozzle 35 and begin to engage and compress the strips 38 and begin to be lifted and conveyed uphill by the vacuum conveyer belt means. The necessary vacuum is established through the perforated belt 25 and within the passages 54 as previously stated.

Substantially simultaneously, the pans travel further over the apex defined by roll 22 and when the centers of gravity of the pans pass over the apex, the pans tilt downwardly automatically by gravity toward the downhill belt portion 18, and if need be, the deflector rails 50 aid the pans in so tilting. This tilting action depicted in FIGURE 3 separates the pans abruptly from the loaves which are being conveyed uphill by the vacuum conveyer belt means 25–38. The particular angles of inclination of the vacuum conveyer belt and pan conveyer belt and the included angle between the downhill belt portion 18 and the vacuum conveyer belt and the location of the apex roll 22 relative to the vacuum conveyer and the slightly greater speed of the vacuum conveyer are all important factors which contribute to the proper complete separation of the loaves and pans in a minimum time and without any physical interference between the trailing ends of the loaves and the trailing ends of the pans during the critical abrupt separation thereof. It is this relatively abrupt and clean separation of the loaves from the pans which constitutes a very great improvement over prior art practices. The arrangement makes it possible to utilize a much shorter lifting vacuum zone than commonly employed to gradually lift or separate the loaves from their pans as previously mentioned. It is highly desirable to apply lifting vacuum to the tender loaves for the briefest possible time interval and to utilize the minimum degree of vacuum for lifting the load and these objectives are fully realized in the present invention. Additionally, the overall mode of operation herein is much more rapid than the prior art practices.

Figure 3:
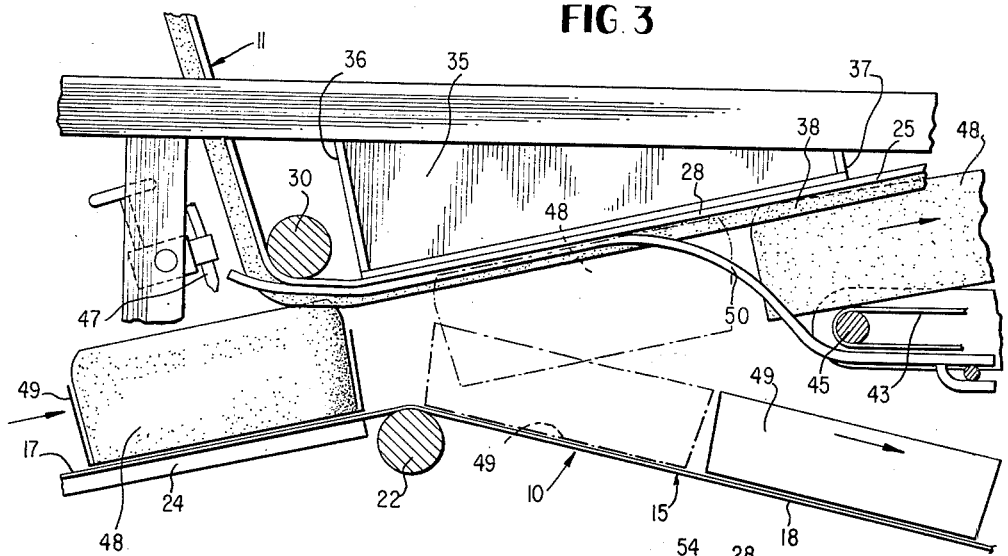
FIGURE 3 is an enlarged fragmentary side elevation showing the tilting of the pans over the apex of the pan conveyor and associated elements.

As soon as the loaves and pans separate fully on their divergent paths, FIGURE 3, the uphill moving loaves begin to pass beyond the vacuum zone under the nozzle 35. As soon as this occurs, the loaves are automatically released from the vacuum conveyer means and deposited by gravity upon the transfer conveyer 43 in an orderly sequence and in a continuous cycle of operation. In like manner, the empty pans travel downhill on the belt portion 18 and pass onto the transfer conveyer 46.

In FIGURES 6 and 7, there is shown another and somewhat more refined embodiment of the invention relating to a bread loaf depanner substantially identical in its operation to the previously described apparatus, but having the added feature of being readily convertible to a bun or roll depanner substantially of the type shown in said prior patent.

Referring specifically to FIGURES 6 and 7, the former shows the apparatus adjusted for depanning and transferring bread loaves and the like, whereas the latter figure shows the apparatus adjusted for handling buns or rolls. In these figures, the numeral 55 designates the main supporting framework carrying the overhead vacuum conveyer means 56, which may be identical to the previously described vacuum conveyer means 11 and need not therefore be redescribed in detail.

A pan conveyer 57 corresponds generally to the pan conveyer 10 of the prior embodiment and includes a rigid horizontal supporting frame 58, bodily mounted upon power-operated lifting jacks 59 which are mechanically linked together at 60 for operation in unison to raise or lower the conveyer 57 relative to the fixed vacuum conveyer 56. The pan conveyer 57 further comprises an independent pair of endless conveyer belts 61 and 62 having their corresponding outer ends engaging rolls 63 and their inner ends engaging rolls 64 and 65. The rolls 64 and 65 are closely spaced and parallel and the roll 64 in FIGURE 6 defines the apex of the uphill-downhill conveyer 57 for bread loaves. The roll 65 is positioned slightly below the apex roll 64, and the latter is positioned adjustably relative to the vacuum conveyer 56 in the identical manner described in the prior embodiment of the invention. One or more of the rolls 63, 64 and 65 may be powered to cause movement of the belts 61 and 62 in the direction of the arrows. These belts may be individually powered or they may be geared together by conventional means, if desired.

The conveyer 57 further comprises a pair of conveyer belt frames 66 and 67 whose inner ends are pivoted upon the axis or shaft 68 of apex roll 64, such roll and shaft being suitably mounted upon a rigid upright extension 69 of conveyer frame 58. The rolls 63 and 65 are journaled for rotation upon the frame sections 66 and 67 and bodily movable therewith. The outer ends of frame sections 66 and 67 are adapted to be elevated to the level positions shown in FIGURE 7 through the medium of additional conventional power jacks 70, in turn securely mounted upon the framework 55 and linked together at 71 to operate in unison independently of the jacks 59.

Laterally adjustable guide means 72 for pans entering upon the top run of belt 61 is provided upon the frame section 66, and this means may be identical to the means 23 of the prior embodiment and is shown somewhat more completely in FIGURES 6 and 7. Magnet means 73 identical to the previously described means 24 and for the same purpose is disposed beneath the top run of belt 61. The previously identified air jet nozzles 47 may be employed in the present embodiment along with the previously identified pan deflector rails 50.

A depanned product transfer conveyer 74 substantially identical to the conveyer 43 is arranged beneath the vacuum conveyer 56 and carried by a rigid upright 75 attached to the frame 58, so that the conveyer 74 may be raised and lowered bodily with the pan conveyer 57. The product transfer conveyer 74 also preferably has a fine adjustment upwardly and downwardly and also angularly if desired, relative to the conveyers 56 and 57 and these adjustments per se may be conventional and need not be shown or described in full detail. The frame 58 has a longitudinal extension 76 carrying an empty pan transfer conveyer 77 corresponding to the previously identified conveyer 46 and the conveyer 77 is also movable vertically with the conveyers 57 and 74 by means of the primary jacks 59. The several conveyer belts move during operation of the apparatus in the direction of the arrows and are powered and coordinated as to speed in the same manner previously mentioned in the prior embodiment shown in FIGURES 1–5.

With the apparatus adjusted as depicted in FIGURE 6, the operation thereof for depanning and transferring bread loaves is identical ot the operation of the apparatus shown in FIGURES 1–5 inclusive and the description of this operation or method need not be repeated.

FIGURE 7 differs from FIGURE 6 only in that the pan conveyer 57 has been adjusted by the jack means 70 to elevate the outer ends of the conveyer frame sections 66 and 67 so as to render the pan conveyer level or horizontal for the depanning and transferring of buns or rolls as described in said prior patent. As shown, a short fixed transfer conveyer section 78, rigid with the framework 55 is positioned to receive the empty roll pans as they pass from the discharge end of the pan conveyer 57 in FIGURE 7. The transfer conveyer 77 is not utilized during the depanning of buns or rolls and likewise the conveyer 78 is not utilized during the depanning of bread loaves.

In the processing of buns or rolls, the apparatus of FIGURE 7 operates substantially as described in said prior patent and also in the same general manner described above in the first form of the invention. The significant difference in operation over the bread loaf depanner is that the pan conveyer 57 is level and the pans containing buns or rolls are fed horizontally on this conveyer beneath the overhead vacuum conveyer 56 and there is no tilting or abrupt lowering of the pans to effect sudden separation of the loaves therefrom. Instead, the pans continue to travel horizontally upon the level belts 61 and 62 while the vacuum conveyer 56 lifts and conveys the buns or rolls upwardly and deposits them upon the transfer conveyer 74 in the same manner previously described herein and described in said patent.

The pan deflector rails 50 are not employed during the use of the apparatus as a bun or roll depanner. As shown in FIGURE 7, rails 50 are removed for bun depanning and the bun pans are held down against the lifting action of the suction force by the magnet means 73—73 beneath the top runs of the pan conveyer belts. The air jet nozzles 47 previously described may be employed during bun depanning to initially loosen the buns.

As previously mentioned, FIGURE 6 shows the general arrangement of the convertible apparatus for bread depanning; however, it will be noted that the apparatus in FIGURE 6 has been elevated to the bun depanning level whereby the transfer conveyer 74 is moved toward the vacuum conveyer 56 a predetermined distance such as the distance to enable bun transfer. It will therefore be necessary in FIGURE 6 to utilize the jacks 59 for lowering the pan conveyer 57 and transfer conveyer 74 a proper distance below the vacuum conveyer 56 to facilitate the proper depanning and transferring of bread loaves in the manner already described in the first embodiment of the invention. In all other respects, FIGURE 6 represents the arrangement of parts suitable for bread depanning, and all parts not described in detail in connection with FIGURES 6 and 7 are the same in construction and operation as the corresponding parts in the prior embodiment.

An analysis of FIGURES 6 and 7 will indicate the adjustments required to convert the apparatus from a bread depanner to a bun depanner, FIGURE 6 showing the elevation step of the entire lower pan conveyer 57 and FIGURE 7 showing the upward pivoting adjustment of the sections 66 and 67 to arrange the pan conveyer in a horizontal position. It will also be noted in FIGURE 7 that the deflector rails 50 are removed, as stated, and it will be recognized that the magnet means 73—73 are utilized particularly since the bun pans are lightweight and must be held down against the action of the suction.

In connection with the convertible apparatus in FIGURES 6 and 7, the suction fan means not shown in detial is constructed for variable speed operation so that a variable lifting vacuum can be applied through the vacuum belt to the products. That is to say, in the case of bread loaves, the fan means will operate faster for creating more suction to elevate the heavier product, and in the case of buns, the fan means will run more slowly and provide the lighter suction required to elevate the buns.

The foregoing description and drawings may suggest various modifications, which modifications are deemed to be within the scope of the invention as defined by the appended claims.

Having thus described my invention, I claim:

1. Apparatus for depanning and transferring bread loaves and the like comprising a first conveyer having an uphill input portion for panned bread loaves and a downhill discharge portion for empty pans and an apex at the juncture of said portions over which said pans are adapted to tilt when their centers of gravity ride over said apex, an uphill inclined perforated conveyer above said apex and overlying said downhill portion in divergent relation thereto, and means to create a loaf lifting vacuum through said perforated conveyer near and above said apex and extending a predetermined distance downstream from said apex for lifting loaves from their pans as the latter ride over said apex and tilt downwardly onto said downhill portion, whereby abrupt separation of said loaves from said pans is effected.

2. The invention as defined by claim 1, and wherein said uphill and downhill portions of said first conveyer are each inclined about 12 degrees below the horizontal, there being an included angle of about 24 degrees between said uphill perforated conveyer and said downhill portion of the first conveyer.

3. The invention as defined by claim 1, and means for initially loosening said loaves in said pans when the latter are on the uphill portion of said first conveyer.

4. The invention as defined by claim 3, wherein said loosening means is a plurality of pneumatic jets directed downwardly upon said loaves and pans.

5. The invention as defined by claim 1, and deflector means engageable with said pans riding over said apex to urge said pans onto said downhill portion of the first conveyer.

6. A bread loaf depanner and transfer apparatus readily convertible to a bun or roll depanner and transfer apparatus comprising support means, an overhead inclined vacuum conveyer on said support means adapted to exert a lifting force on bread loaves, bun or rolls and to carry them uphill, a pan conveyer arranged below said vacuum conveyer, means carrying the pan conveyer and operable to raise and lower the same bodily relative to the vacuum conveyer, said pan conveyer including pivotal sections adapted to be inclined uphill and downhill respectively for carrying bread loaf pans toward and away from said vacuum conveyer and also adapted to be substantially horizontally disposed for carrying bun or roll pans under the vacuum conveyer, and means connected with said pan conveyer sections and operable to shift them to or from said inclined and substantially horizontal positions.

7. The invention as defined by claim 6, and wherein the inner ends of said pan conveyor sections are pivotally interconnected and the outer ends thereof are vertically swingable and said last-named means comprises jacks connected with said outer ends to raise and lower the same.

8. The invention as defined by claim 6, and magnetic pan hold-down means near and below the tops of said pivotal pan conveyer sections.

9. Bread loaf depanner apparatus comprising a pan conveyer having uphill and downhill sections, an uphill loaf conveyer extending above said pan conveyer, means to create a loaf lifting force adjacent to a portion of said loaf conveyer to lift loaves from said pans while the pans are moving from said uphill to said downhill pan conveyer sections, discharge conveyer means for said loaves separate from said loaf conveyor and receiving loaves therefrom upon release of the loaves from the loaf conveyer, said pan conveyer sections being vertically swingable upon a common pivot axis adjacent their inner ends to facilitate converting said loaf depanner apparatus to a bun or roll depanner apparatus, and extensible and retractable means connected with said pan conveyer sections on opposite sides of said pivot axis to raise and lower said sections.

10. Apparatus for depanning and transferring bread loaves comprising a first conveyer having an uphill input portion for a panned bread loaf with the long axis of the loaf extending longitudinally of and along the path of conveyance, said first conveyer having a downhill discharge portion for an empty pan and an apex at the juncture of the portions over which said pan is adapted to tilt when it rides over said apex, an uphill inclined loaf conveyer above said apex and overlying said downhill discharge portion in a divergent relation thereto, said loaf conveyer having openings therethrough, means to create a loaf lifting vacuum in a suction zone at said uphill conveyer near and above said apex and extending a predetermined distance downstream from said apex for lifting a loaf from the pan as the latter rides over said apex and tilts downwardly onto said downhill discharge portion of said first conveyer whereby abrupt separation of the resultant suspended loaf from the pan is effected, and discharge means for said suspended loaf positioned under said loaf conveyer near and below the downstream end of said suction zone for receiving a released loaf from said loaf conveyer.

11. Apparatus as defined in claim 10 and wherein said downhill discharge portion of said first conveyer is inclined about 12 degrees below the horizontal, there being an included angle of about 24 degrees between said uphill inclined loaf conveyer and said downhill portion of the first conveyer.

12. Apparatus as defined in claim 11 and deflector means engageable within the pan riding over said apex to urge said pan onto the downhill discharge portion of the first conveyer.

13. Apparatus as set forth in claim 10 and means for adjusting said first conveyer to place said uphill input portion and said downhill discharge portion in a substantially horizontal planar condition for carrying bun or roll pans.

14. Apparatus as set forth in claim 10 and wherein said uphill input portion and said downhill discharge portion of said first conveyer are each vertically swingable about their adjacent inner ends at said apex to facilitate conversion to a bun or roll depanner apparatus, and extensible and retractable means connected with said input portion and said discharge portion on opposite sides of the apex to raise and lower the portions.

15. Apparatus for depanning and transferring bread loaves and the like comprising a first conveyer having an input portion for panned bread loaves and a downhill discharge portion for empty pans and an apex at the juncture of said portions over which said pans are adapted to tilt when their centers of gravity ride over said apex, a perforated conveyer above said apex and overlying said downhill portion in divergent relation thereto, and means to create a loaf lifting vacuum through said perforated conveyer near and above said apex and extending a predetermined distance downstream from said apex for lifting loaves from their pans as the latter ride over said apex and tilt downwardly onto said downhill portion, whereby abrupt separation of said loaves from said pans is effected.

16. Bread loaf depanner apparatus comprising a pan conveyer having first and second sections and an apex at the juncture of said sections over which said pans are adapted to tilt when their centers of gravity ride over said apex, a loaf conveyer extending above said pan conveyer, means to create a loaf lifting force adjacent to a portion of said loaf conveyer to lift loaves from said pans while the pans are moving from said first to said second pan conveyer sections, discharge conveyer means for said loaves separate from said loaf conveyer and receiving loaves therefrom upon release of the loaves from the loaf conveyer, said pan conveyer sections being vertically swingable upon a common pivot axis adjacent their inner ends to facilitate converting said loaf depanner apparatus to a bun or roll depanner apparatus, and extensible and retractable means connected with said pan conveyer sections on opposite sides of said pivot axis to raise and lower said sections.

References Cited in the file of this patent
UNITED STATES PATENTS

| | | |
|---|---|---|
| 2,886,195 | Stadelman | May 12, 1959 |
| 2,927,707 | Reed et al. | Mar. 8, 1960 |
| 2,975,920 | Reed et al. | Mar. 21, 1961 |
| 3,011,667 | Copping | Dec. 5, 1961 |
| 3,057,497 | Stadelman | Oct. 9, 1962 |
| 3,066,812 | Stadelman | Dec. 4, 1962 |
| 3,080,079 | Lecrone et al. | Mar. 5, 1963 |